United States Patent
Bosch et al.

(10) Patent No.: US 6,424,581 B1
(45) Date of Patent: Jul. 23, 2002

(54) WRITE-ONCE MEMORY ARRAY CONTROLLER, SYSTEM, AND METHOD

(75) Inventors: Derek J. Bosch, Mountain View; Christopher S. Moore, San Jose; Daniel C. Steere, Menlo Park; J. James Tringali, Los Altos, all of CA (US)

(73) Assignee: Matrix Semiconductor, Inc., Santa Clara, CA (US)

( * ) Notice: Subject to any disclaimer, the term of this patent is extended or adjusted under 35 U.S.C. 154(b) by 0 days.

(21) Appl. No.: 09/638,427

(22) Filed: Aug. 14, 2000

(51) Int. Cl.⁷ .................................................. G11C 7/00
(52) U.S. Cl. ....................... 365/195; 711/163
(58) Field of Search .................. 365/195; 711/163, 711/164; 369/275.1–275.4

(56) References Cited

U.S. PATENT DOCUMENTS

| | | | |
|---|---|---|---|
| 4,272,880 A | 6/1981 | Pashley | |
| 4,442,507 A | 4/1984 | Roesner | |
| 4,489,478 A | 12/1984 | Sakurai | |
| 4,498,226 A | 2/1985 | Inoue et al. | |
| 4,499,557 A | 2/1985 | Holmberg et al. | |
| 4,646,266 A | 2/1987 | Ovshinsky et al. | |
| 4,677,742 A | 7/1987 | Ovshinsky et al. | |
| 5,070,384 A | 12/1991 | McCollum et al. | |
| 5,233,576 A | * 8/1993 | Curtis et al. | 369/13 |

(List continued on next page.)

FOREIGN PATENT DOCUMENTS

WO    WO 99/14763    3/1999

OTHER PUBLICATIONS

Douglas, John H., "*The Route To 3–D Chips*", High Technology, Sep. 1983, vol. 3, No. 9, pp. 55–59.
Edited by Cappelletti, Paulo et al., "*Flash Memories*", Kluwer Academic Publishers, 1999.
Kawashima, Shoichiro et al., "A Charge–Transfer Amplifier and an Encoded–Bus Architecture for Low–Power SRAM's", IEE Journal of Solid–State Circuits, vol. 33, No. 5, May 1998, pp. 793–799.
Zhang, Ph.D., Guobiao, "Three–Dimensional Read–Only Memory (3D–ROM)", presentation from website zhangpatents, pp. 1–29.
Zhang, Ph.D., Guobiao, "3D–ROM—A First Practical Step Towards 3–DIC" Semiconductor International, Jul. 2000, from website zhangpatents, pp. 1–7.

Primary Examiner—Richard Elms
Assistant Examiner—Van Thu Nguyen
(74) Attorney, Agent, or Firm—Brinks Hofer Gilson & Lione

(57) ABSTRACT

A write-once memory device includes a memory array controller and an electronically resetable flag. The memory array controller prevents writing and erasing from a write-once memory array unless the flag is in a selected state. The memory device is used with a data storage system that automatically determines whether a memory device installed in the data storage system is a write-once memory, and then automatically sends a recognition signal to the memory device once it has been determined to be a write-once memory. The memory device (1) automatically sets the flag in response to the recognition signal, (2) automatically refuses to implement write and erase commands prior to receipt of the recognition signal and setting of the flag, and (3) implements write and erase commands subsequent to receipt of the recognition signal and setting of the flag. The memory device implements nondestructive commands such as read and status commands regardless of the state of the flag.

15 Claims, 3 Drawing Sheets

U.S. PATENT DOCUMENTS

| | | |
|---|---|---|
| 5,306,935 A | 4/1994 | Esquivel et al. |
| 5,427,979 A | 6/1995 | Chang |
| 5,441,907 A | 8/1995 | Sung et al. |
| 5,535,156 A | 7/1996 | Levy et al. |
| 5,602,987 A | 2/1997 | Harari et al. |
| 5,640,343 A | 6/1997 | Gallagher et al. |
| 5,745,407 A | 4/1998 | Levy et al. |
| 5,835,396 A | 11/1998 | Zhang |
| 5,848,026 A * | 12/1998 | Ramamurthy ............ 365/238.5 |
| 5,940,854 A * | 8/1999 | Green, Jr. et al. .......... 711/112 |
| 6,034,882 A | 3/2000 | Johnson et al. |
| 6,243,837 B1 * | 6/2001 | Zimmermann et al. ....... 714/51 |
| 6,272,038 B1 * | 8/2001 | Clausen et al. ............. 365/151 |

* cited by examiner

WRITE-ONCE MEMORY ARRAY CONTROLLER, SYSTEM, AND METHOD

BACKGROUND

The present invention relates to improved systems and methods for controlling a write-once memory to prevent inadvertent writing or erasing.

Non-volatile memory is becoming standard in many products such as digital cameras and digital audio players. Traditional non-volatile memory has been rewritable, allowing the data storage system to erase and write over existing data.

With the advent of more cost-effective write-once memory devices, a mechanism is needed to prevent existing data storage systems from performing destructive operations (such as erase or write) to the write-once memory device.

BRIEF SUMMARY

The embodiments described below include a memory device having a write-once memory array, an electronically resetable flag, and a memory array controller. The controller prevents writing into and erasing from the write-once memory device unless the flag is in a selected state.

This memory device is used with a data storage system that automatically determines whether a memory device installed in the data storage system is a write-once memory device, and automatically sends a recognition signal to the memory device when the installed memory device is determined to be a write-once memory. The memory device responds to the recognition signal by setting the flag to the selected state, and the memory device controller automatically refuses to implement write and erase commands prior to receipt of the recognition signal, while implementing such destructive commands subsequent to the receipt of the recognition signal. At all times, regardless of the state of the flag, the memory array controller implements nondestructive commands such as status and read commands.

Because the memory device does not implement destructive commands until the recognition signal is received, data storage systems that are not suited to use with write-once memories are prevented from altering the contents of the write-once memory array.

This section has been provided by way of general introduction, and it is not intended to limit the scope of the following claims.

DETAILED DESCRIPTION OF THE PREFERRED EMBODIMENTS

Figure 1:
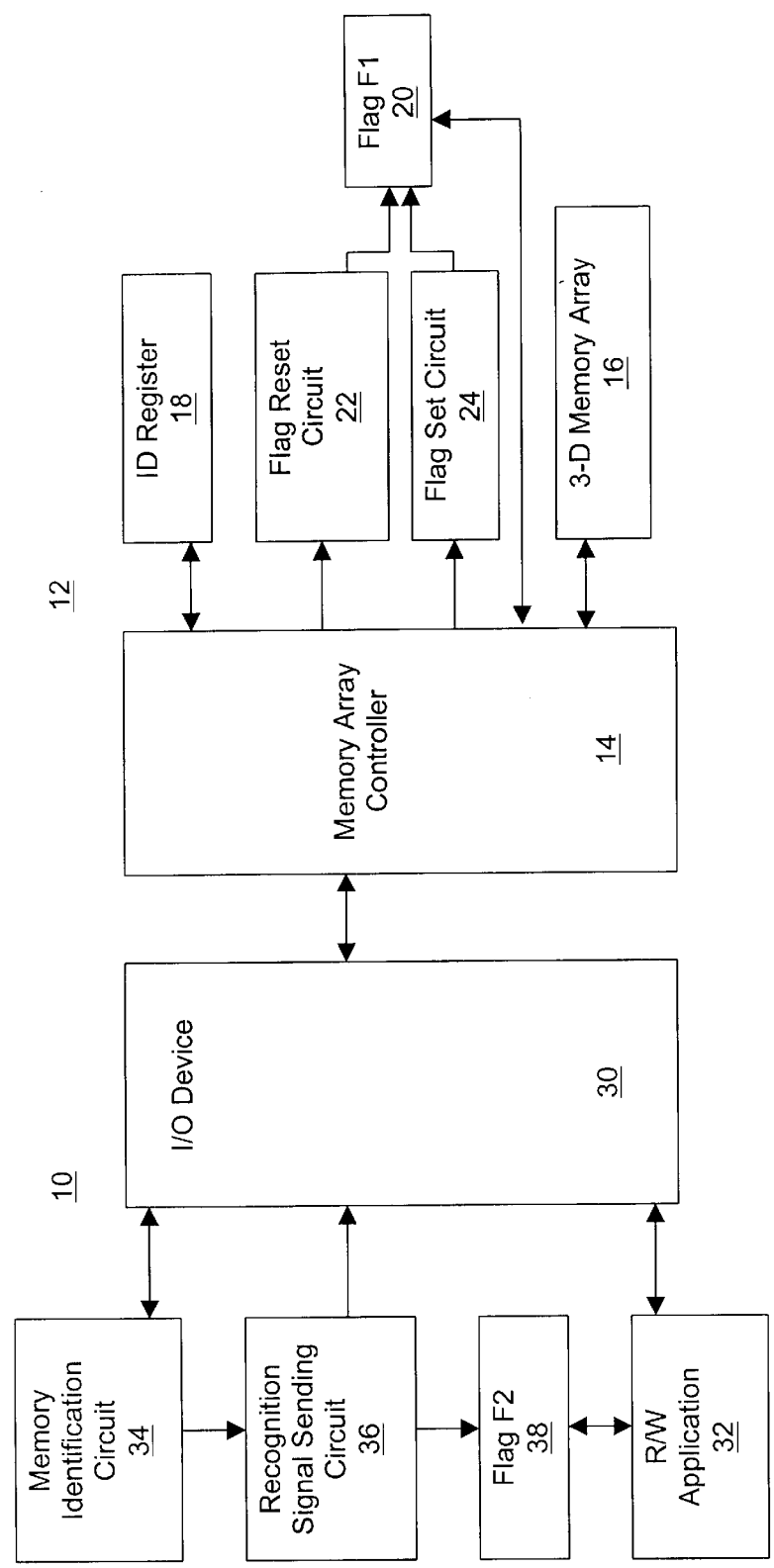
FIG. 1 is a block diagram of a data storage system and an associated write-once memory device that incorporate preferred embodiments of the present invention.

Turning now to the drawings, FIG. 1 shows a block diagram of a data storage system 10 coupled to a write-once memory device 12, The data storage system 10 can be any device that stores data (including, for example, text, image, audio, and video signals) in a memory device. The write-once memory device 12 is preferably coupled to the data storage system 10 by an electrical connector, such that the write-once memory device 12 can readily be removed from the data storage system 10 and replaced with another memory device. For example, the data storage system 10 may be a digital camera, a digital audio player, a digital book, or a general purpose computer. The write-once memory device 12 may be a card, stick, or other modular unit that is readily inserted into and removed from a corresponding port (not shown) in the data storage system 10. The memory device 12 can have any suitable storage capacity, such as for example 2, 20, or 200 megabytes.

As shown in FIG. 1, the write-once memory device 12 includes a memory array controller that controls read, write, and erase operations to and from a memory array 16. Except for the specific functions described below, the memory array controller 14 can be entirely conventional, and can for example be entirely or partly formed as an array of CMOS gates on the same substrate that supports the memory array 16. The memory array controller 14 may include interface logic for one or more standard protocols (i.e., a device interface unit) and it may include one or more integrated circuits. The memory array can be a two-dimensional or three-dimensional memory array, but in this embodiment is implemented as a write-once three-dimensional memory array. Suitable memory arrays are described in Johnson U.S. Pat. No. 6,034,882, Knall U.S. patent application Ser. No. 09/560,626, and U.S. patent application Ser. No. 09/639,579. These patent documents describe particularly high density, inexpensive write-once memory arrays suitable for use with this invention. As pointed out above, this invention is not limited to memory arrays of this type, and that any suitable memory array can be used.

The memory device 12 also includes an ID register 18 that stores an ID code. This ID code can be combined with other information, such as for example a serial number or label for the memory device 12. However, the ID code itself is shared by multiple individual memory devices 12, and is indicative of the fact that the memory device 12 is a write-once memory device, not a rewriteable memory device.

The memory device 12 also includes a flag register 20 that stores a. flag F1. This flag register 20 is reset by a flag reset circuit 22 and set by a flag set circuit 24. The circuits 22, 24 are under the control of the memory array controller 14, and the state of the flag F1 can be read by the memory array controller 14, all as described below in conjunction with FIG. 3.

The data storage system 10 includes an I/O device 30 that controls communication to and from the memory device 12. The I/O device 30 is coupled to a read/write application 32. The read/write application 32 can be any application that reads data from the memory device 12 or writes data into the memory device 12 via the I/O device 30. For example, the read/write application 32 may be a digital image application that reads digital images from the memory device 12 and writes digital images into the memory device 12. Many other alternatives are possible. Other than the specific features described below, the read/write application 32 and the I/O device 30 may be conventional, and are therefore not described here in greater detail.

In addition to the conventional components described above, the data storage system 12 also includes a memory identification circuit 34, a recognition signal sending circuit 36, and a flag register 38 for a flag F2. The memory identification circuit 34 reads the ID code from the register 18 and compares the ID code with stored values to determine whether or not the memory device is a write-once memory device.

In the event a particular memory device is recognized as a write-once memory device (by virtue of storing the proper ID code in the register 18), then the memory identification circuit 34 causes the recognition signal sending circuit 36 to transmit a recognition signal to the memory device 12. Also, the recognition signal sending circuit 36 in this case sets the flag F2 in the flag register 38.

The flag F2 is used by the read/write application 32 to identify whether or not a particular memory device is a write-once memory device. The read/write application 32 may use different memory management techniques for write-once memories than for rewriteable memories. As one example, the read/write application 32 may automatically write preliminary, incomplete, or draft versions of a set of data into a rewriteable memory, while not doing so for a write-once memory.

Figure 2:
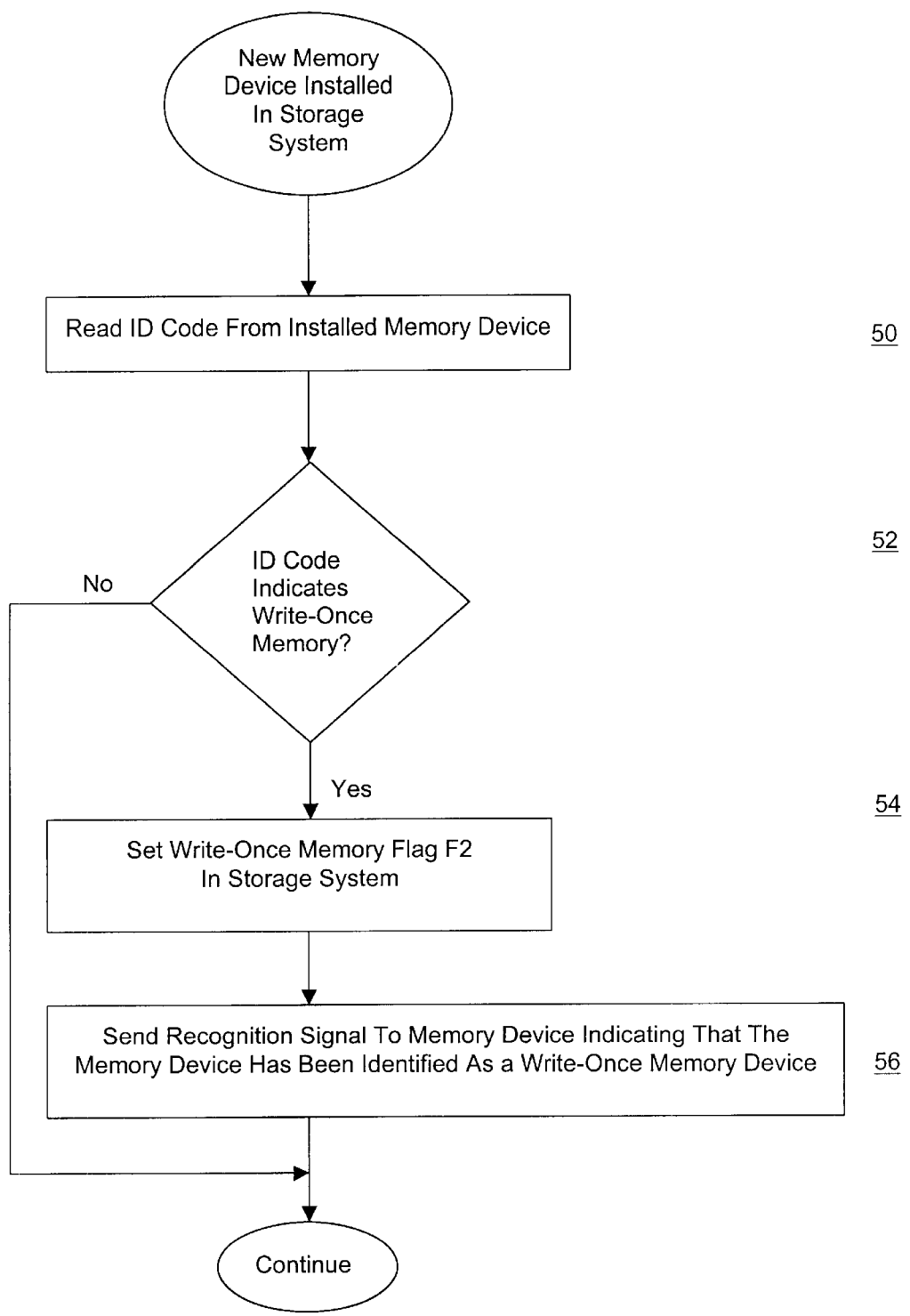
FIG. 2 is a flow chart of a method implemented by the data storage system of FIG. 1.

FIG. 2 is a flow chart of a method implemented by the data storage system 10. Once a new memory device is installed in the storage system, the storage system first reads the ID code from the installed memory device in block 50. In block 52 the ID code is compared with a pre-selected set of values to determine whether the ID code indicates that the memory device is a write-once memory. If not, no action is taken. However, if the ID code indicates the presence of a write-once memory, the write-once memory flag F2 is set in block 54, and a recognition signal is sent to the memory device in block 56. This recognition signal indicates to the memory device that the memory device has been identified as a write-once memory device.

Figure 3:
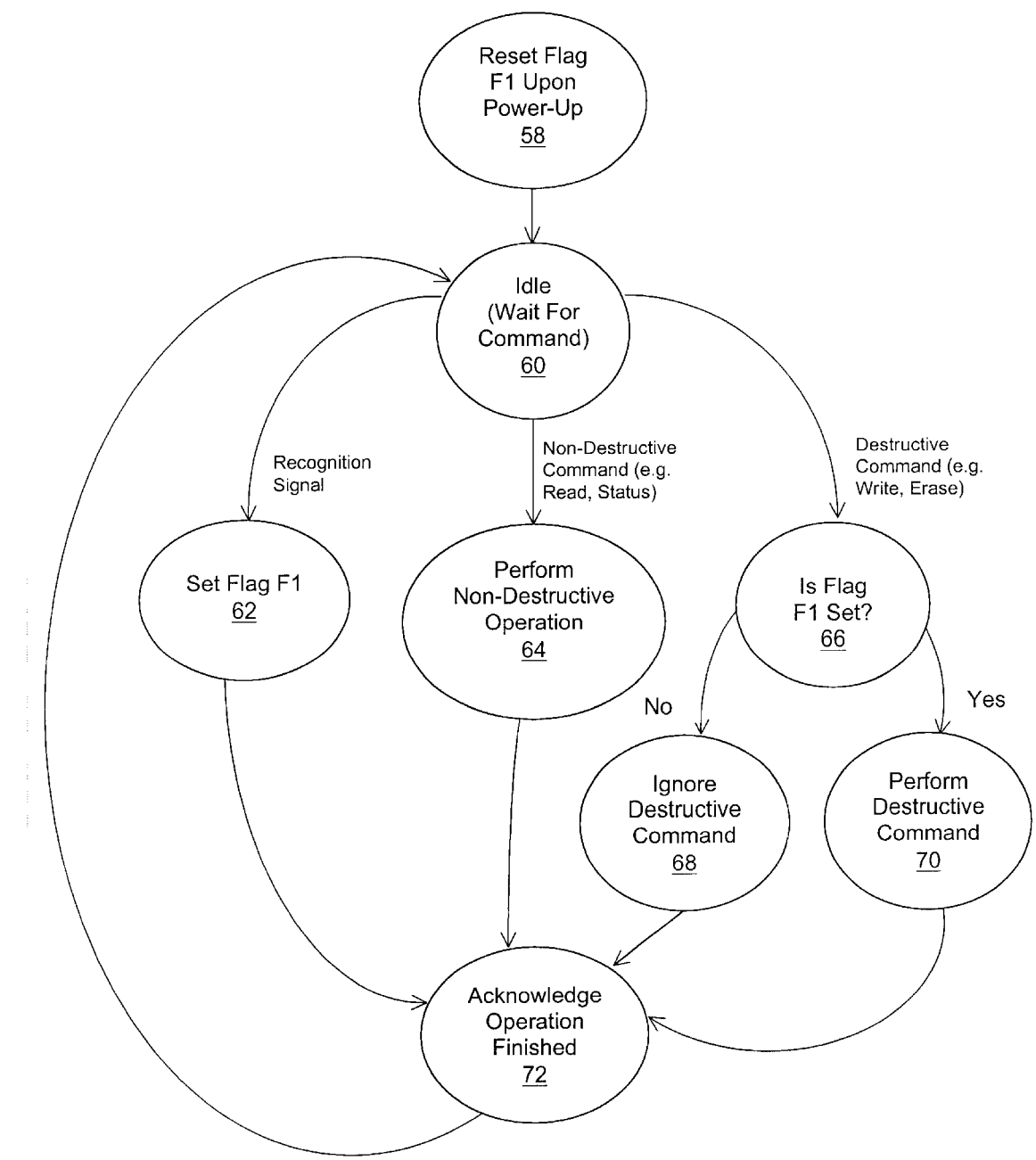
FIG. 3 is a state diagram illustrating operation of the write-once memory device of FIG. 1.

FIG. 3 is a state diagram illustrating operation of the write-once memory device 12. Upon initial application of power to the memory device 12, the flag F1 is reset in block 58. Then control is transferred to block 60, in which the controller 14 waits for a command. Possible commands include the recognition signal described above, nondestructive commands such as read and status commands, and destructive commands such as write and erase commands.

When a recognition signal is received, control is transferred to block 62, where the flag F1 is set. This operation is acknowledged in block 72, and then control is returned to the idle state of block 60.

When a received command is a nondestructive command, control is transferred from block 60 to block 62, where the nondestructive operation is performed, regardless of the state of the flag F1. In this way, the data storage system 10 is permitted to read and inquire as to status of the memory device 12 in the conventional way, whether or not the data storage system 10 has recognized the memory device as a write-once memory device and issued the recognition signal described above. After the nondestructive operation has been performed, it is acknowledged in block 72 and control is returned to the idle state of block 60.

When a received command is a destructive command, control is transferred to block 66, where the flag F1 is checked. If the flag F1 is set (indicating that the memory device has been recognized as a write-once memory device), the destructive command is performed in block 70. If the flag F1 is not set (indicating that the memory device has not been recognized as a write-once memory device), control is transferred to block 68, where the destructive command is ignored. In either case, the operation is acknowledged in block 72 and control is then returned to the idle state of block 60.

In this way, destructive operations such as write commands and erase commands are not performed until after the data storage system has identified the memory device as a write-once memory device and sent the appropriate recognition signal. Implementation of write and erase commands that are inappropriate for a write-once memory can thereby be avoided.

As an example of one application for the preferred embodiment described above, the digital storage system 10 may be a digital camera, a digital audio player, or a digital book that is used to field program one or more digital media files into the write-once memory device 12. As used herein the term "digital media file" is intended broadly to encompass a file of copyrightable subject matter such as one or a sequence of digital images, digital audio files, and digital text files such as those suitable for use in an electronic book. Particular advantages are obtained in terms of low cost, write-once memory devices if the memory device 12 includes a three-dimensional array of write-once, field programmable memory cells that store the desired digital media files.

The elements and acts described above can be implemented in many ways, and the present invention is not to be limited to any specific implementation. The following section provides details on a number of specific implementations in order to define the best mode currently contemplated by the inventors.

Best Mode Details

One simple implementation is to use existing commands that can be performed on a conventional rewriteable memory device in a new way to perform the functions described above. For example, the ID register 18 can include one or more conventional registers set to a specific value indicative of a write-once memory device. These registers can then be used with a conventional query register value command.

For example, one conventional rewriteable memory protocol (known as CompactFlash) includes a Sector Count Register, a Sector Number Register, and a Cylinder Number Register. These three registers can be set to distinct, unique values to indicate that the memory device is a write-once memory device, and these three registers can be read with the CompactFlash command known as Identify Drive.

As another alternative, the data storage system can identify a memory device as a write-once memory device by a physical, magnetic or optical characteristic detectable from the exterior of the write-once memory device. This characteristic is physically, magnetically, or optically sensed by the data storage system to identify a memory device as a write-once memory device.

The recognition signal described above can also take many forms. For example, the recognition signal may be a new command or opcode that the memory device recognizes as the recognition signal. Alternately, an existing command can be extended. In one implementation, sending a specific value of a conventional command is interpreted by the memory array controller 14 as a recognition signal. For example, the SmartMedia standard specifies that the Read ID command must send an address of zero to the memory device. Sending a specified, non-zero address with the Read ID command can be used as the recognition signal. As another alternative, the recognition signal sending circuit 36 can perform a read or write operation from a specified nonexistent memory location or several memory locations in sequence. For example, if the write-once memory device 12 stores data in memory locations 0x0000 through 0x3fff, the recognition signal sending circuit 36 can read or write into the nonexistent address 0xffff. The memory array controller 14 can be constructed to interpret such an attempted read or write operation as the recognition signal described above.

Concluding Remarks

The functions described above can be implemented using any suitable technology. For example, the circuits 34, 36 can be implemented as any desired combination of hardware, firmware, and software, as can the memory array controller 14. The circuits 22, 24 as well as the register 18 and the flag register 20 can all be integrated in the memory array controller 14. Similarly, the circuits 34, 36 and the flag register 38 can be integrated in the I/O device 30. Any suitable integrated circuit fabrication technology can be used to implement these elements. Similarly, any desired packaging arrangement for the memory device can be used, and the data storage system 10 can take any appropriate form. The embodiments described above are well-suited for use in memory devices and digital media storage devices of the type described in U.S. patent applications Ser. Nos. 091638, 428, 091638,439 and 09/638,334, all three of which are filed on the same date as the present application, assigned to the assignee of the present invention, and hereby incorporated by reference in their entirety.

It should be apparent from the foregoing that an improved method and apparatus have been described to improve the efficiency with which a write-once memory device is used. Nondestructive commands are implemented, whether or not the data storage system has identified the memory device as a write-once memory device and issued the appropriate recognition signal. Destructive commands such as write and erase commands are not implemented until after the data storage system has identified the memory device as a write-once memory device and issued the appropriate recognition signal. In this way, a data storage system that is not equipped to use a write-once memory device efficiently can readily be prevented from inadvertently using the memory capacity of a write-once memory device in an inefficient manner.

As used herein the term "selected state" is intended broadly to include a single-value state or a plurality of single-value states.

The term "data storage" is intended broadly to encompass storage of any type of digital data, including music, text, images, video and miscellaneous files.

The term "circuit" is intended broadly to encompass physical systems for implementing the described functions, whether implemented as hardware, software, firmware or some combination thereof.

The term "set" is intended to mean one or more.

The foregoing detailed description has described only a few of the many forms that this invention can take. For this reason, this detailed description is intended by way of illustration, and not limitation. It is only the following claims, including all equivalents, that are intended to define the scope of this invention.

What is claimed is:

1. A memory device comprising:
   a permanently write-once memory array;
   an electronically resettable flag; and
   a memory array controller responsive to the flag and coupled to the write-once memory array, said controller operative to prevent at least one of writing into and erasing from the write-once memory array unless the flag is in a selected state;
   wherein the memory device forms a modular unit adapted to be readily inserted into and removed from a data storage system, and wherein the memory array, the flag, and the controller are all included in the modular unit.

2. The memory device of claim 1 further comprising:
   a flag setting circuit included in the modular unit and operative to set the flag to the selected state in response to a recognition signal.

3. The memory device of claim 1 wherein the flag comprises a volatile memory element that automatically resets to a reset state, different from the selected state, when power is removed from the memory device.

4. The memory device of claim 1 wherein the memory device comprises:
   a reset circuit operative to automatically reset the flag when power is applied to the memory device.

5. The memory device of claim 1 wherein the write-once memory array comprises a 3-D memory array.

6. The memory device of claim 2 wherein the memory device further comprises:
   a register operative to store a code identifying the memory device as a write-once memory device.

7. The memory device of claim 6 wherein the memory device is coupled with a data storage system, and wherein the data storage system comprises:
   a first circuit operative to read the code from the register and to identify the memory device as a write-once memory in response to selected values of the code; and
   a second circuit, responsive to the first circuit and operative to send the recognition signal to the flag-setting circuit when the first circuit identifies the memory device as a write-once memory.

8. The memory device of claim 6 wherein the memory array controller is operative to implement read commands from the write-once memory array both when the flag is in the selected state and when the flag is not in the selected state.

9. The memory device of claim 6 wherein the memory array controller is operative to implement status commands from the write-once memory array both when the flag is in the selected state and when the flag is not in the selected state.

10. A data storage system comprising:
    first means for identifying a modular memory device removably coupled with a port of the data storage system as a write-once memory; and
    second means for sending a recognition signal from the data storage system to the modular memory device when the first means identifies the modular memory device as a write-once memory,
    said recognition signal indicating to the modular memory device that the data storage system has recognized the modular memory device as a write-once memory.

11. The data storage system of claim 10 wherein the first means comprises:
    means for reading an identifying code from the memory device; and
    means for identifying when the identifying code indicates that the memory device comprises a write-once memory.

12. A method for controlling a write-once memory device, said method comprising:
    (a) providing a permanently write-once memory array and a memory controller coupled with the memory array, said memory array and memory controller included in a modular memory device;
    (b) automatically refusing at the modular memory device to implement at least one of write and erase commands with the memory array and the memory controller prior to receipt of a recognition signal by the memory device; and
    (c) implementing at the modular memory device said at least one of write and erase commands with the memory array and the memory controller subsequent to receipt of the recognition signal by the memory device.

13. The method of claim 12 further comprising:

(d) automatically implementing at least one of read and status commands with the memory array and the memory controller prior to receipt of the recognition signal as well as subsequent to receipt of the recognition signal by the memory device.

14. A memory device comprising:

a write-once memory array;

an electronically resettable flag; and a memory array controller responsive to the flag and coupled to the write-once memory array, said controller operative to prevent at least one of writing into and erasing from the write-once memory array unless the flag is in a selected state;

wherein the flag comprises a volatile memory element that automatically resets to a reset state, different from the selected state, when power is removed from the memory device.

15. A memory device comprising:

a write-once memory array;

an electronically resettable flag; and a memory array controller responsive to the flag and coupled to the write-once memory array, said controller operative to prevent at least one of writing into and erasing from the write-once memory array unless the flag is in a selected state;

a reset circuit operative to automatically reset the flag when power is applied to the memory device.

* * * * *

UNITED STATES PATENT AND TRADEMARK OFFICE
CERTIFICATE OF CORRECTION

PATENT NO.    : 6,424,581 B1
DATED         : July 23, 2002
INVENTOR(S)   : Derek J. Bosch et al.

It is certified that error appears in the above-identified patent and that said Letters Patent is hereby corrected as shown below:

Title page,
Item [56], References Cited, U.S. PATENT DOCUMENTS, delete "Ovshinsky et al." and substitute -- Johnson -- in its place.
OTHER PUBLICATIONS, "Zhang, Ph.D. Guobiso" reference, delete "3-DIC" and substitute -- 3D-IC -- in its place.

Signed and Sealed this

Sixteenth Day of March, 2004

JON W. DUDAS
*Acting Director of the United States Patent and Trademark Office*